United States Patent
Griesbach et al.

(10) Patent No.: US 12,137,073 B2
(45) Date of Patent: Nov. 5, 2024

(54) EMAIL SUMMARY AND COMPLETION CHECK

(71) Applicant: Google LLC, Mountain View, CA (US)

(72) Inventors: David Majic Griesbach, Daly City, CA (US); Henry Dlhopolsky, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 47 days.

(21) Appl. No.: 17/745,197

(22) Filed: May 16, 2022

(65) Prior Publication Data

US 2023/0370410 A1    Nov. 16, 2023

(51) Int. Cl.
*H04L 51/216* (2022.01)
*H04L 51/063* (2022.01)
*H04L 51/56* (2022.01)

(52) U.S. Cl.
CPC .......... *H04L 51/216* (2022.05); *H04L 51/063* (2013.01); *H04L 51/56* (2022.05)

(58) Field of Classification Search
CPC ..... H04L 51/216; H04L 51/56; H04L 51/063; G06F 3/048
See application file for complete search history.

(56) References Cited

U.S. PATENT DOCUMENTS

| | | | |
|---|---|---|---|
| 9,116,984 B2 * | 8/2015 | Caldwell | G06F 16/345 |
| 11,240,186 B2 * | 2/2022 | Angle | G06F 3/0482 |
| 2009/0157819 A1 * | 6/2009 | Hampton | H04L 51/066 |
| | | | 709/206 |
| 2013/0007640 A1 | 1/2013 | Chao | |
| 2015/0263995 A1 * | 9/2015 | Mahood | H04L 51/04 |
| | | | 715/753 |
| 2017/0154264 A1 * | 6/2017 | Chen | G06N 5/04 |
| 2019/0036850 A1 * | 1/2019 | Kushwaha | H04L 51/043 |

(Continued)

FOREIGN PATENT DOCUMENTS

| | | | | |
|---|---|---|---|---|
| CN | 110855547 A | * | 2/2020 | H04L 51/12 |
| WO | 2021126242 A1 | | 6/2021 | |

OTHER PUBLICATIONS

Stack Overflow. "What does it mean when an answer is accepted?" Mar. 16, 2021. StackOverflow. <https://web.archive.org/web/20210316072229/https://stackoverflow.com/help/accepted-answer> (Year: 2021).*

(Continued)

*Primary Examiner* — Liang Y Li
(74) *Attorney, Agent, or Firm* — Botos Churchill IP Law LLP

(57) ABSTRACT

The technology manages message threads. A computing system is configured to detect at least one question in a message thread and to determine if the message thread includes at least one answer responding to the at least one question. From this, the system generates a summary of the message thread based on the detection of the at least one question and the determination of the at least one answer, and outputs for display the summary of the message thread to a recipient of the message thread. The output may involve visually indicating the detected at least one question and/or visually indicating the at least one answer responding to the at least one question. The detected at least one question and the at least one answer may be visually indicated in a manner distinct from remaining content of the message thread.

18 Claims, 16 Drawing Sheets

(56) References Cited

U.S. PATENT DOCUMENTS

| | | | |
|---|---|---|---|
| 2019/0087391 A1* | 3/2019 | Cranshaw | G06F 40/151 |
| 2019/0171693 A1* | 6/2019 | Dotan-Cohen | G06F 40/106 |
| 2019/0386949 A1* | 12/2019 | Vennam | H04L 65/403 |
| 2021/0051120 A1* | 2/2021 | Pottier | H04L 67/54 |
| 2021/0133287 A1 | 5/2021 | Ayloo | |
| 2021/0174016 A1 | 6/2021 | Fox et al. | |
| 2021/0311973 A1* | 10/2021 | Radhakrishnan | G06F 16/36 |
| 2021/0342743 A1* | 11/2021 | Woolf | G06F 16/245 |
| 2022/0067618 A1* | 3/2022 | Goli | G06F 40/211 |
| 2023/0359657 A1* | 11/2023 | Ganhotra | G06F 16/3329 |
| 2024/0056404 A1* | 2/2024 | Matthews | G06F 3/04847 |

OTHER PUBLICATIONS

Strestha, Lokesh, et al., "Detection of Question-Answer Pairs in Email Conversations", Columbia University, Computer Science Department, 2004, pp. 1-7.

Extended European Search Report issued in corresponding European Patent Application No. 22201086.0, mailed May 15, 2023, 10 pages.

Rambow, Owen, et al., "Summarizing Email Threads", Proceedings of HLT-NAACL 2004: Short Papers on XX, HLT-NAACL '04, Jan. 1, 2004 (Jan. 1, 2004), pp. 105-108,XP055169227, Morristown, NJ, USA DOI: 10.3115/1613984.1614011 ISBN: 978-1-93-243224-4.

* cited by examiner

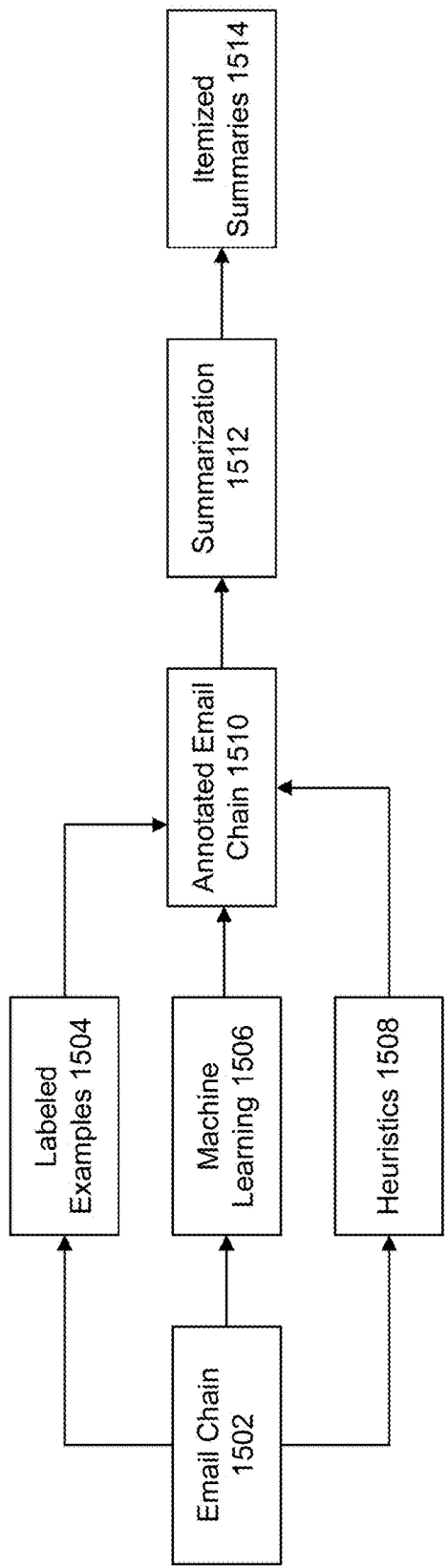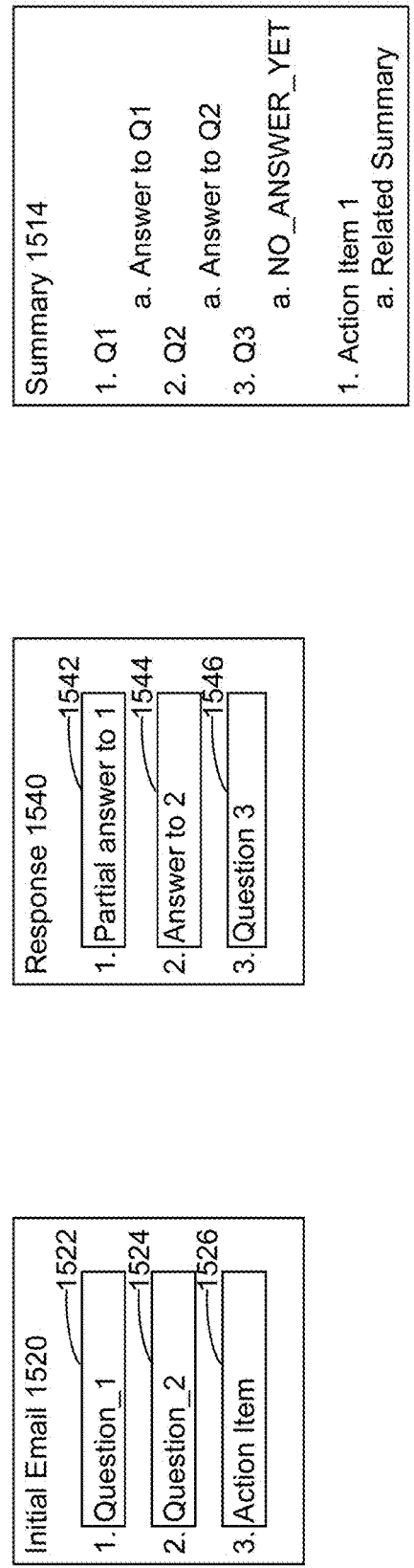
FIG. 15A
FIG. 15B
FIG. 15C
FIG. 15D

EMAIL SUMMARY AND COMPLETION CHECK

BACKGROUND

Email and other complex, unstructured communication such as a forum thread with many replies can be convoluted and difficult to parse and understand. For example, back and forth emails create a long record of information, thoughts, questions, and answers that are cumbersome to read, search through, and parse, especially if someone is added to a thread after much back and forth has already occurred.

For instance, an email thread may start with three people on it. If there is a question, two or more people may be added to answer the question. If they do not know the answer, they may become non-responsive or drop out of the email thread, while other people may be added. Then, the email thread can become a thread of dozens of questions and dozens of people. In this type of situation, people on the email thread may easily lose sight of what is originally asked, what are the open questions or open action items that need to be dealt with.

To address these issues in a conventional manner, somebody such as a moderator or the originator of the thread would need to manually parse through the entire email thread or forum thread, manually identify open question and/or action items to make sure that all questions and/or action items do get resolved. The manual process is labor intensive and may not be effective. Any oversight can easily cause key information to be difficult to access or even become lost.

BRIEF SUMMARY

Aspects of the disclosure provide a summarization technology that automatically generates a summarization of an email thread. The technology can manage a universe of questions and answers in the email thread. The technology can summarize key ideas of an email thread, identify all questions in the email thread, identify all answers to the questions, call out key stakeholders and their action items that are still open, as well as allow for automatic and manual updates to the summary.

One aspect involves providing a summary of the email or other thread to recipients of that thread, in a form of a constantly updating widget. Alternatively, the summary can be sent as a summary email or other notification once the thread has concluded, such as after a period of inactivity or via sentiment analysis of the final message. The summary of the thread can include a summary of questions and key ideas of the thread to ensure that all relevant questions have been answered before the thread has concluded. Both machine learning models and tagging/annotating can be used to identify the questions and answers in the email thread.

The technology described herein can expand to include summarization of any communication thread, such as forums with complex, multi-layer structure, including for example exchanges through collaborative on-line groups.

According to one aspect, a system for managing message threads comprises memory configured to store summaries of a plurality of message threads and one or more processors. The one or more processors are configured to: detect at least one question in a message thread, determine if the message thread includes at least one answer responding to the at least one question, generate a summary of the message thread based on the detection of the at least one question and the determination of the at least one answer, and output for display the summary of the message thread to a recipient of the message thread. The output may involve visually indicating the detected at least one question and/or visually indicating the at least one answer responding to the at least one question. The detected at least one question and the at least one answer may be visually indicated in a manner distinct from remaining content of the message thread.

The detected at least one question may be visually indicated via a banner. The at least one answer responding to the at least one question may be visually indicated via a banner. The summary may include a survey prompting the recipient of the message thread to indicate whether the at least one answer is acceptable. Here, the summary may visually indicate whether the at least one answer has been accepted. The summary may visually indicate any question in the message thread without any corresponding answer.

The message thread may be an email thread and the one or more processors are configured to display the summary of the email thread in a widget. The summary may be displayed to the recipient in an editable manner which allows the recipient to update the summary. Here, the one or more processors are configured to store the updated summary in the memory.

The summary may identify one or more of the following: a party who asked the at least one question, a party who provided the at least one answer responding to the at least one question, at least one action item resulted from the message thread, and a party responsible for the at least one action item. The summary may identify at least one fork message thread featuring a topic distinct from an original topic of the message thread.

The one or more processors may be configured to map questions and answers in the message thread based on one or more of the following: at least one uncommon word, at least one unique character, or at least one unique combination of emojis. The one or more processors may be configured to map questions and answers in the message thread based on one or more of the following: number identification where any question and its corresponding answer are identified by a same number, proximation between any question and its corresponding answer, proximation of characters that have a causal relationship, or identification of adjacent emails that have a causal relationship. The one or more processors may be configured to determine an end of the message thread based on at least one or more of the following: a period of inactivity of the message thread or sentiment analysis of a final message in the message thread. The one or more processors may be configured to identify at least one fork message thread featuring a topic distinct from an original topic of the message thread. Here, the one or more processors may be configured to generate a summary for each of the at least one fork message thread. The one or more processors may be configured to output for display the generated summary for each of the at least one fork message thread to a recipient of the at least one fork message thread.

The message thread may be an email thread, and the system may be part of a mail exchange server. The one or more processors may be further configured to: initiate the detection of the at least one question in the message thread, in response to a request message, and send the generated summary of the message thread as a reply to the request message. The one or more processors may be further configured to correlate a plurality of message threads based on their topics. The one or more processors may be further configured to coalesce a plurality of message threads based on their topics. Here, the one or more processors may be further configured to: when a reply is submitted in one of the coalesced message threads, send an identical reply to at least one remaining message thread in the coalesced message threads.

According to another aspect, a method for managing message threads is provided. The method comprises: detecting, by one or more processors, at least one question in a message thread; determining, by the one or more processors, if the message thread includes at least one answer responding to the at least one question; generating, by the one or more processors, a summary of the message thread based on the detection of the at least one question and the determination of the at least one answer; storing, by the one or more processors, the summary of the message thread in memory; and outputting, by the one or more processors, for display the summary of the message thread to a recipient of the email message, including: visually indicating the detected at least one question; visually indicating the at least one answer responding to the at least one question; wherein the detected at least one question and the at least one answer are visually indicated in a manner distinct from remaining content of the message thread.

According to another aspect, a system for summarizing content of a communication application comprises one or more processors configured to: detect at least one question in a conversation associated with the communication application; determine if conversation includes at least one answer responding to the at least one question; generate a summary of the conversation based on the detection of the at least one question and the determination of the at least one answer; and output for display the summary of the conversation, including: visually indicate the detected at least one question; visually indicate the at least one answer responding to the at least one question; wherein the detected at least one question and the at least one answer are visually indicated in a manner distinct from remaining content of the conversation. The conversation may be derived from one or more of the following: a forum thread, an email thread, computerized meeting minutes, a messaging group exchange, a voice conversation, or a videoconference meeting.

BRIEF DESCRIPTION OF THE DRAWINGS

FIG. 15A illustrates an example flow diagram showing an exemplary method for annotating and summarizing email threads in accordance with aspects of the disclosure.

FIG. 15B illustrates an example annotated initial email in accordance with aspects of the disclosure.

FIG. 15C illustrates an example annotated response in reply to the initial email of FIG. 15B in accordance with aspects of the disclosure.

FIG. 15D illustrates an example itemized summary in accordance with aspects of the disclosure.

DETAILED DESCRIPTION

Figure 1:
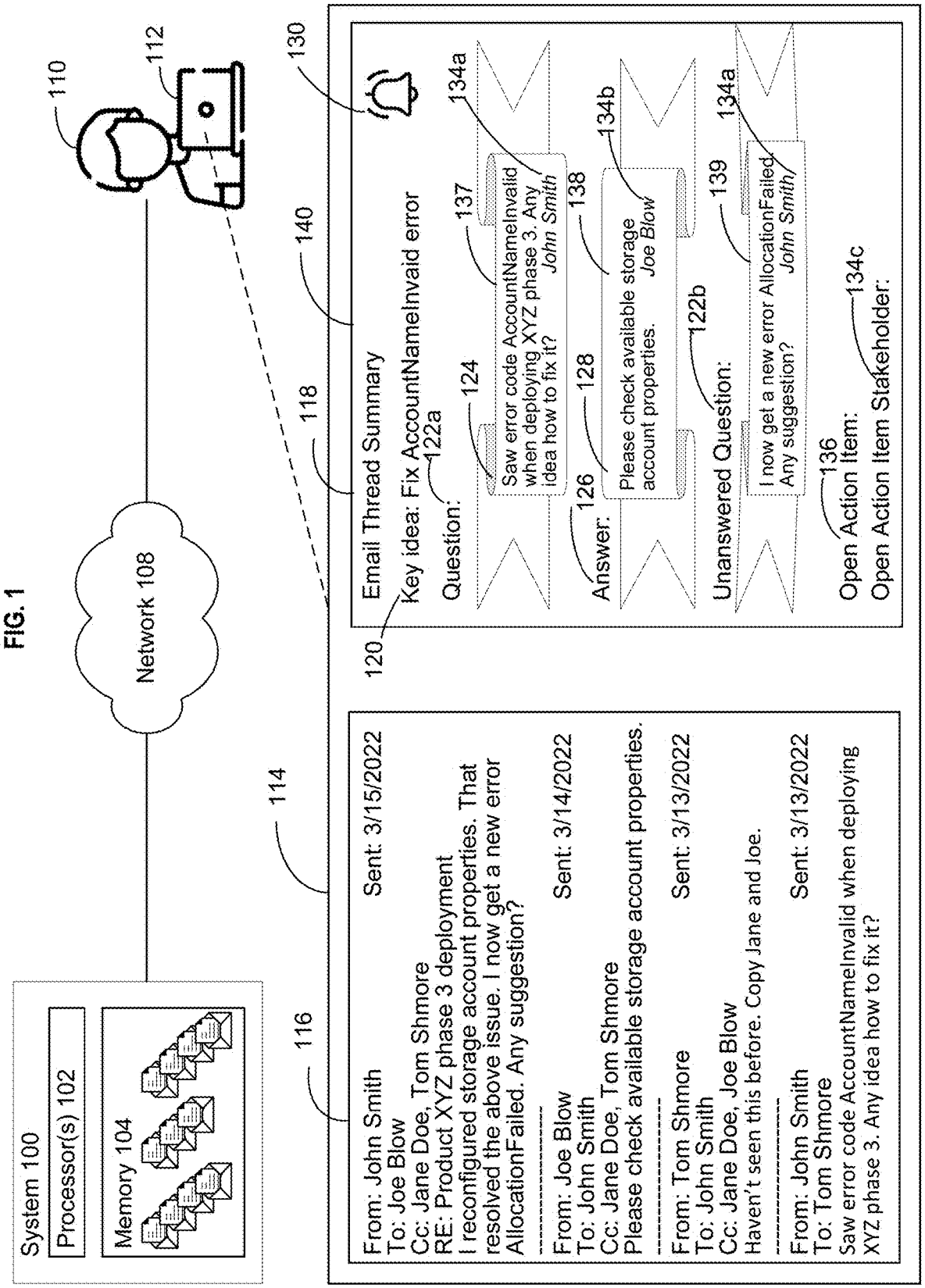
FIG. 1 illustrates a functional diagram of an example system in accordance with aspects of the disclosure.

The present technology will now be described with respect to the following exemplary systems and methods. FIG. 1 illustrates a system 100 for managing email threads. The system 100 may include one or more processors 102 and memory 104 for storing data. In one example, the memory 104 may store summaries of a plurality of email threads.

For each email thread 116, the processor 102 may automatically generate summarization of the email thread, and send a summary 118 of the email thread to a user's device 112 via a network 108. When the user 110 views any email thread, a summary 118 of the email thread may be displayed to the user 110 on a graphical user interface (GUI) 114 of the user's device 112. Here, the summary may be presented is a separate pane, window or other region of the GUI from where the email thread 116 is presented. The user 110 may be a recipient of or a participant in the email thread. The summary 118 of the email thread may include, but not limited to, one or more key ideas 120 of the email thread 116, questions 122*a*, 122*b* and answers 126 to the questions identified in the email thread 116, key stakeholders (e.g., participants) 134*a*, 134*b*, 134*c* of the email thread 116, and open action items 136. In such a manner, if an action item 136 is created on an email thread summary 118, the action item can be defined by the originating question 124 as the root and have leaf fields for the sub-questions 122*b*. To determine if an action item is open or closed, machine learning can be used to parse the sentiment of the question 124, the response 128, and the follow up question 122*b* in conjunction with the entities discussing 134*a* and 134*b* to conclude that a dialogue is occurring. Additionally, using both time proximity and sentence structure analysis for example, 139 shows that the recent responses were within an acceptable time period to consider it still feasible to receive a response. By way of example, machine learning can be used to both a) determine the average length of time between responses of this nature to determine if it is likely that this is still open, and b) look for indications of time extension, such as "I will respond in 7 days" or "John Smith is out of office until June 1" to determine if the "open" status should remain as such. Additionally, annotations, such as "snoozing" emails or adding tags to indicate open/closed status, can be used. Also, if the most recent response contains a question, it can be determined that said dialogue is still open, or, alternatively, if the time proximity is exceeded and the most recent response is a statement, or if an annotation indicates the action item is closed, the action item can be deemed closed.

The processor 102 may be configured to detect one or more questions 122a, 122b in the email thread 116. The processor 102 may determine if the email thread 116 includes one or more answers 126 responding to each of the detected questions. Questions and answers in each email may include, but not limited to, text, emoji such as smiley face, and graphic. The processor 102 may identify all questions and answers to all the questions in the email thread 116. The processor 102 may generate the summary 118 of the email thread 116 based on the detected questions and answers.

In addition, the processor 102 may identify key stakeholders of the email thread 116 and their action items that are still open. For each question in the email thread, the processor 102 may identify a party or other stakeholder 134a who asked that question. The processor 102 may identify a party or other stakeholder 134b who provided the answer responding to the question. The processor 102 may identify at least one action item 136 resulted from the email thread. The processor 102 may identify a party or other stakeholder 134c responsible for the at least one action item. The processor 102 may also identify whether the at least one action item is still open (active). The summary 118 of the email thread may identify stakeholders 134a who asked each question, stakeholders 134b who answered each question, action items 136 resulted from the email thread, and stakeholders 134c who are responsible for the action items. Key stakeholders may be identified as the originator of the question or any sub-question (e.g., as determined by sentiment and sentence structure analysis), or any entity that provides a direct response to said question or sub-question.

Further, the processor 102 may summarize key ideas 120 of the email thread 116, and disregard extraneous information of the email thread 116. In order to summarize key ideas, the system can employ machine learning models such as for sentiment analysis, annotations highlighting key aspects, sentence structure analysis to parse statements, identify queries, and strip out superfluous language (e.g., "Sounds good!") as well as machine learning models based on annotations that are fed back into the system to identify the pertinent and relevant parts of the thread and present those for action.

The processor 102 may output for display the summary 118 of the email thread 116 to one or more recipients of the email thread 116. The summary 118 may show identified questions and corresponding answers extracted from the email thread. The processor 102 may display the summary 118 of the email thread to the recipient at certain stages of the email thread to ensure that all relevant questions have been answered before the email thread has concluded.

In one example, the processor 102 may generate the summary of the email thread based on a machine learning model. The model may employ, by way of example, a Transformer-type architecture, a convolutional neural network (CNN), recurrent neural network (RNN), long short-term memory (LSTM) network or combination thereof. For instance, the machine learning model may employ a Transformer-type machine learning architecture as discussed in U.S. Pat. No. 10,452,978, entitled "Attention-based sequence transduction neural networks", the entire disclosure of which is incorporated herein by reference. In one example, the machine learning model may be based on T5 that performs text to text transformation.

The machine learning model may be trained to identify key points in the email thread, and extract questions and answers to those questions from the email thread. The machine learning model may further be trained to map questions to relevant answers, namely, determine which answer corresponds to which question.

Figure 2:
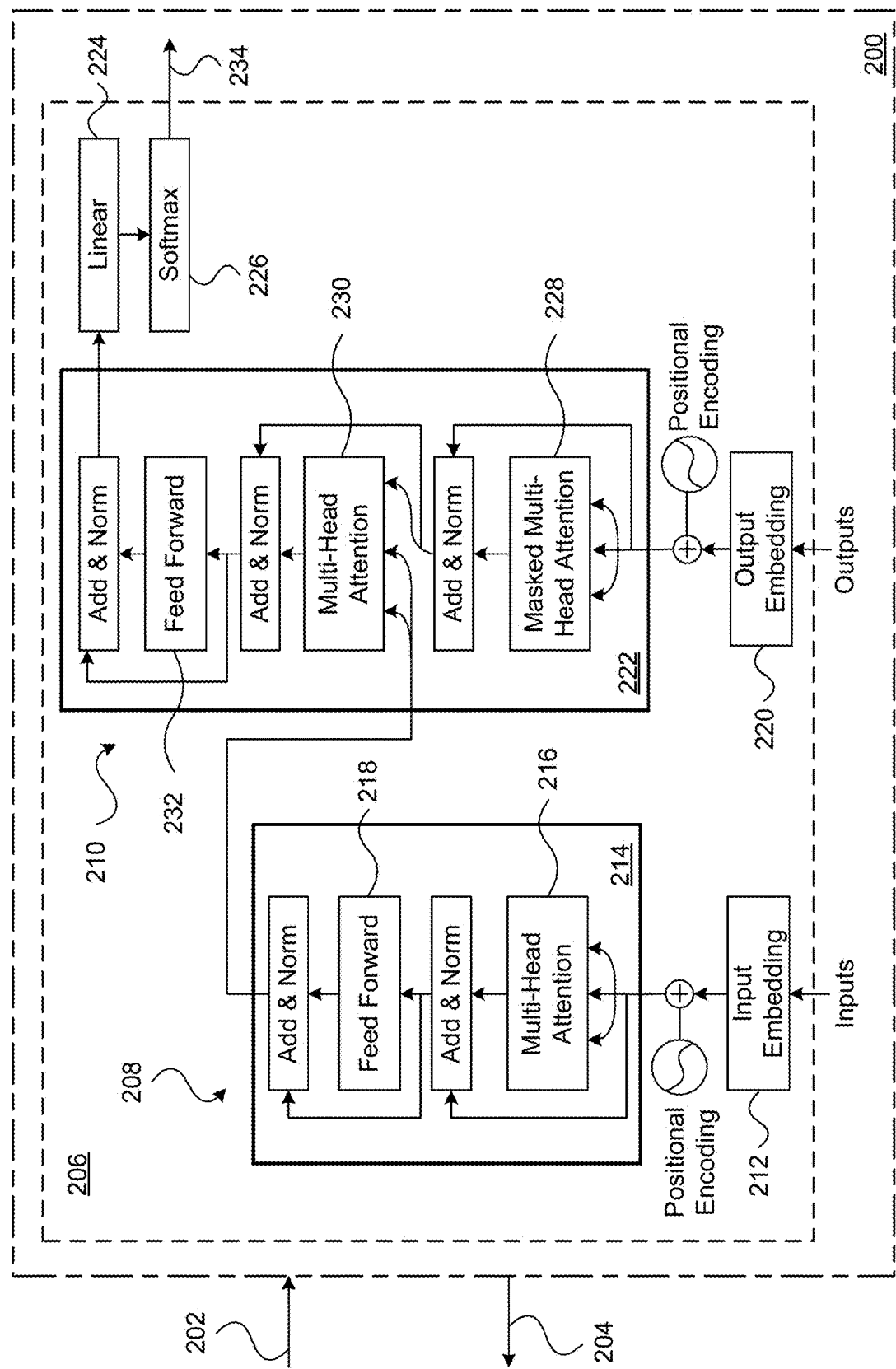
FIG. 2 illustrates a Transformer-type architecture for use in accordance with aspects of the technology.

By way of example only, a Transformer architecture is presented in FIG. 2. In particular, system 200 of FIG. 2 is implementable as computer programs by processors of one or more computers in one or more locations. The system 200 receives an input sequence 202 and processes the input sequence 202 to transduce the input sequence 202 into an output sequence 204. The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured to receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate an updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different sub-networks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output. These two layers being inserted after each of the two sub-layers, both referred to as an "Add & Norm" operation.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution.

The machine learning model may be trained with huge corpus of data of human language. In one example, the machine learning model may be trained with specific example summaries that fit a desired style. For instance, the training data may include email threads with desired summaries at the end of each email thread. The desired summaries may be manually prepared.

In another example, the machine learning model may be trained with generic examples. For example, the machine learning model may be trained with a generic email text thread and a summary at the end identifying questions and corresponding answers in the email thread.

Figure 3A:
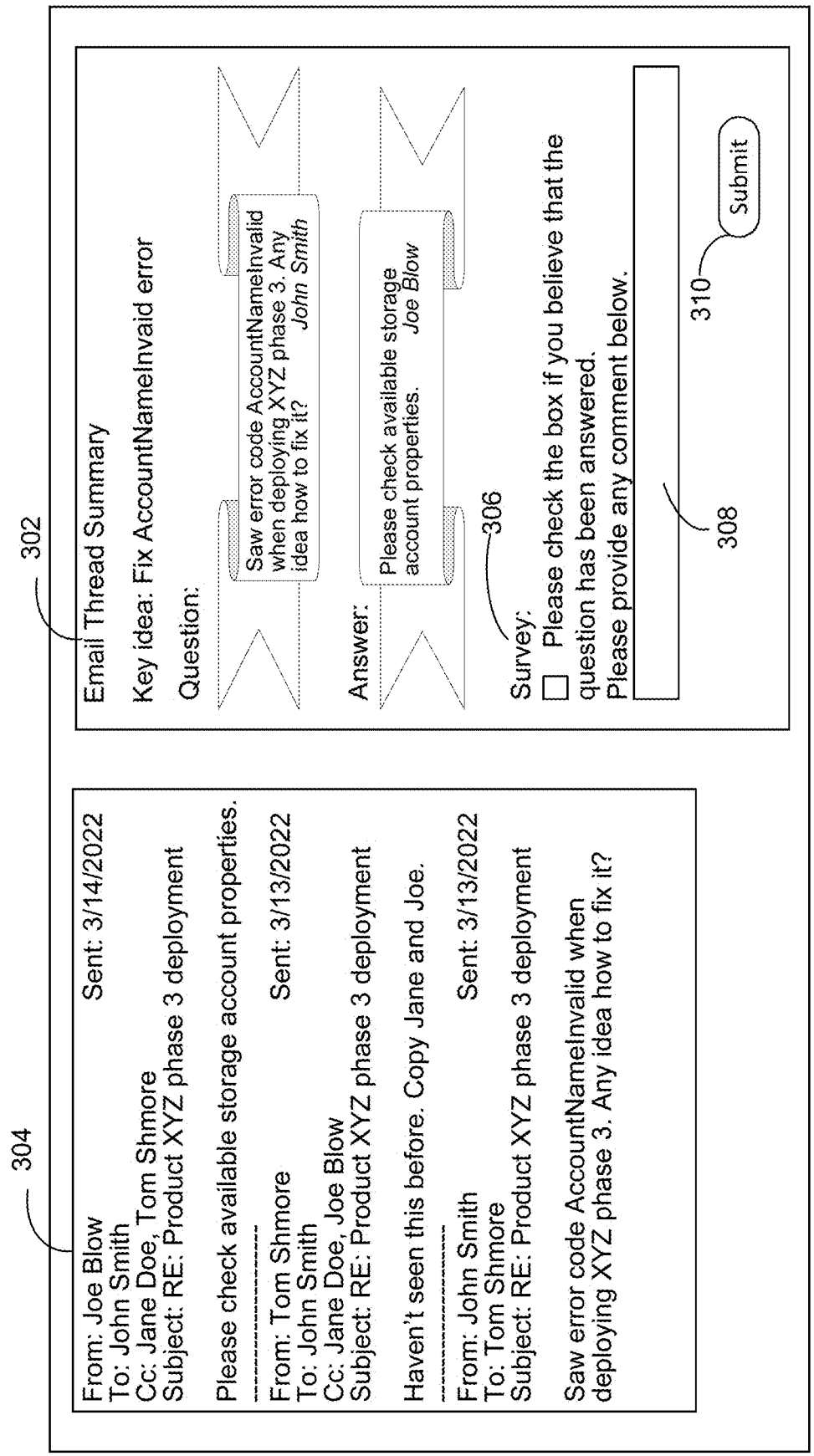
FIG. 3A illustrates an example email thread summary with a survey in accordance with aspects of the disclosure.

In yet another example, the machine learning model may be trained with unsupervised data. For instance, with reference to example 300 of FIG. 3A, the processor 102 may generate a summary 302 of the email thread 304 identifying questions and answers in the email thread 304, and provide a survey 306 at the end to collect real time feedback from a recipient of the email thread. The survey 306 may prompt the recipient to answer if the recipient feels that the question has been answered.

The survey 306 may also present one or more input fields 308 for the recipient to enter his/her thought with respect to each identified answer. For example, the recipient may enter into the input field 308 comments such as "this answer is not relevant" or "this answer is wrong." The recipient may click a submit button 310 to submit the survey result. The processor 102 may perform natural language processing on the recipient's feedback, and update the summary of the email thread based on the recipient's feedback.

Figure 3B:
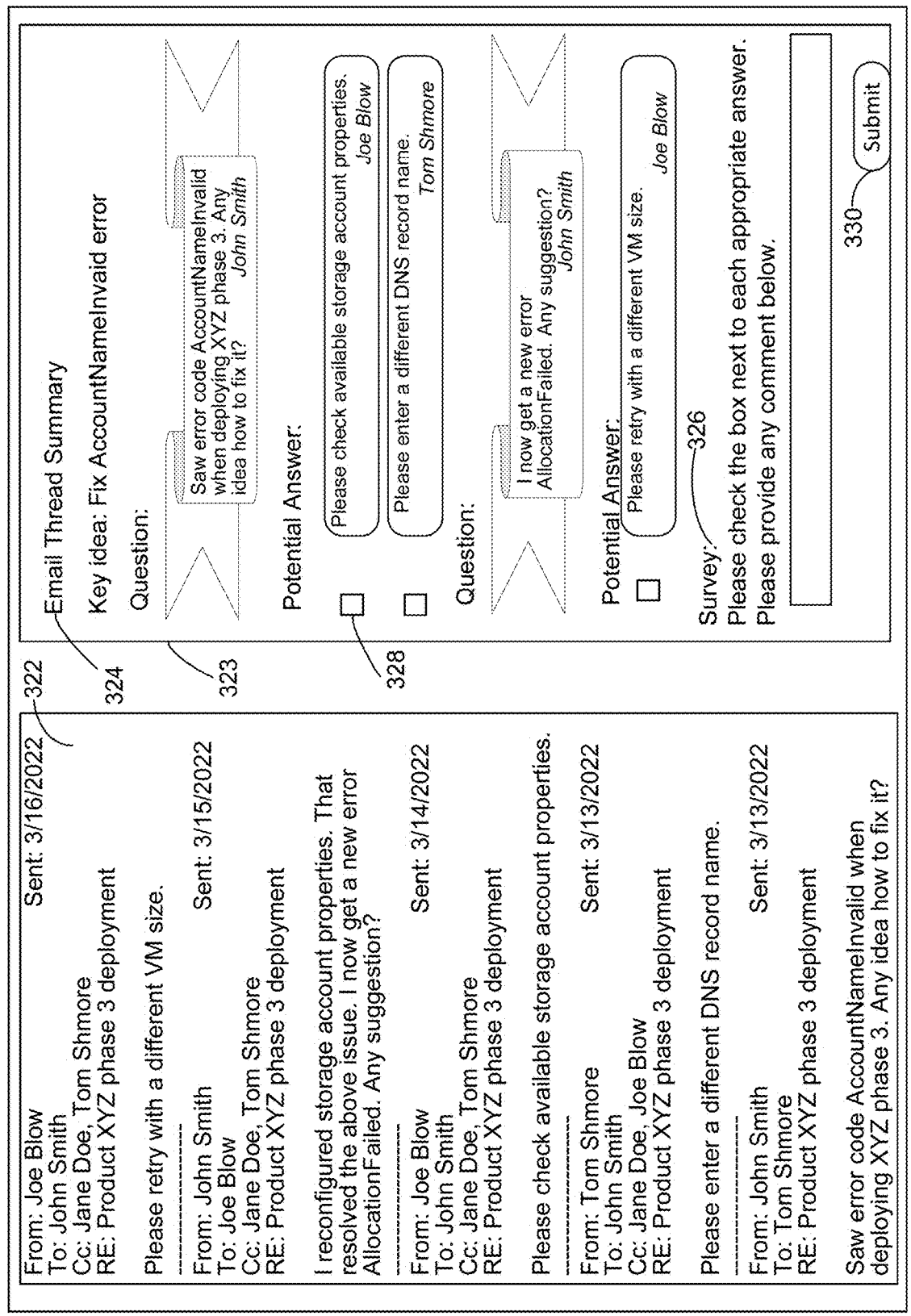
FIG. 3B illustrates an example email thread summary with another survey in accordance with aspects of the disclosure.

As shown in example 320 of FIG. 3B, in the event that email thread 322 includes multiple questions and answers, a separate pane 323 in the GUI can be presented for display on a display device with summary information. Here, the email thread summary 324 may include a survey 326 that may prompt the recipient to indicate whether each detected answer is acceptable. For each detected answer, the summary 326 displays an option, such as a checkbox 328, for the recipient to accept or reject the answer. When multiple answers are identified that correlate to the same question, the summary 324 may request the recipient to select or mark which answer or answers should be accepted. When submitting the survey, e.g., via a submit button 330, if an answer is unselected in the checkbox, that answer may be deemed rejected, wrong or inappropriate. On the other hand, if the answer is selected in the checkbox, that answer may be deemed accepted.

Figure 4:
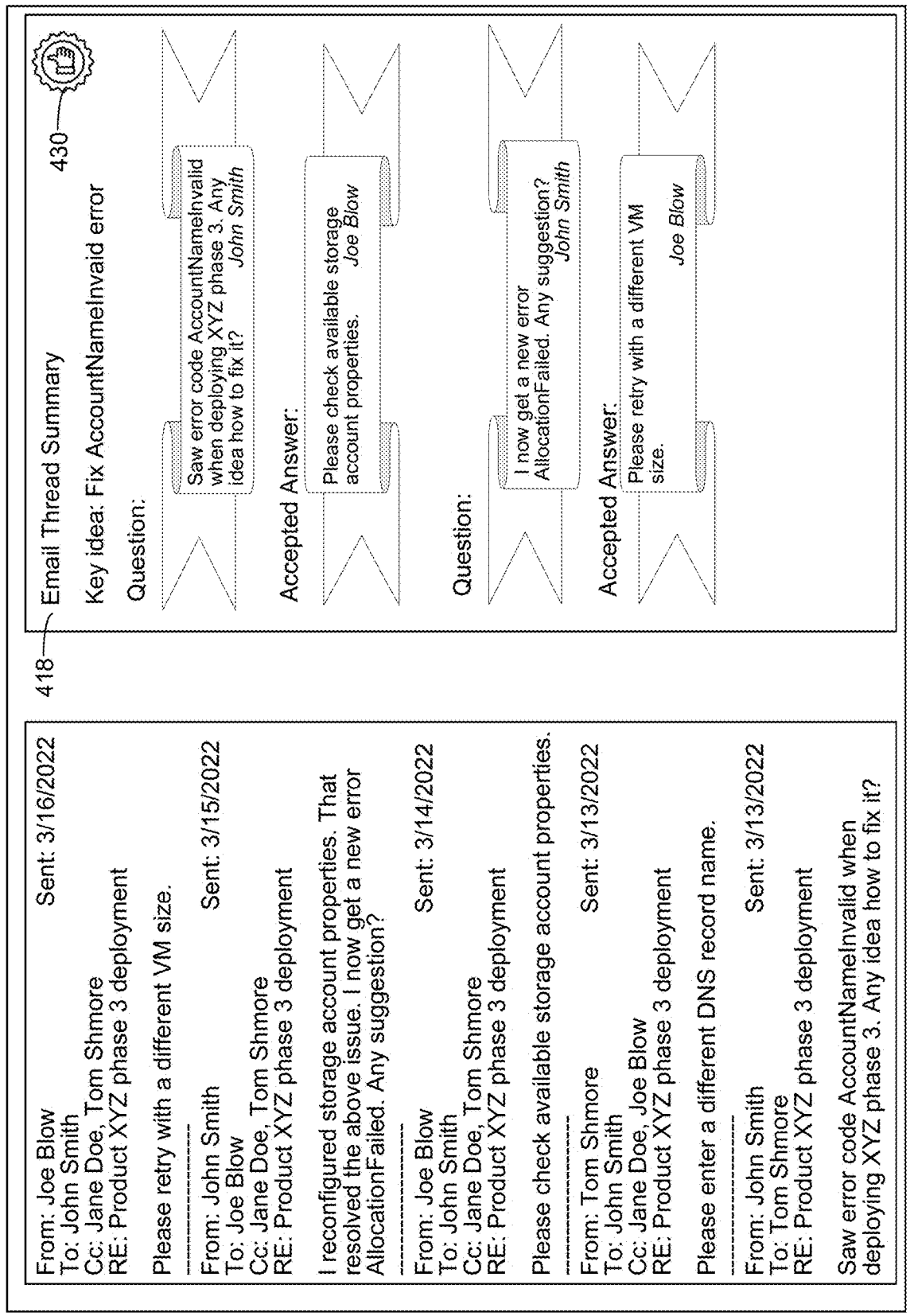
FIG. 4 illustrates an example email thread summary with accepted answers in accordance with aspects of the disclosure.

Once the survey result is submitted, the processor 102 may automatically update the summary based on the survey result. The processor 102 may update the summary of the email thread by removing the rejected answers, and keeping only the accepted answer. For example, as shown in FIG. 4, the updated summary 418 may visually indicate which answers have been accepted.

In another example, if a question has one potential answer, once the recipient indicates that the potential answer is wrong, the processor 102 may update the summary of the email thread by indicating that the question remains open.

In one scenario, the machine learning model may be trained with any of the survey results submitted in FIGS. 2 and 3.

Figure 5:
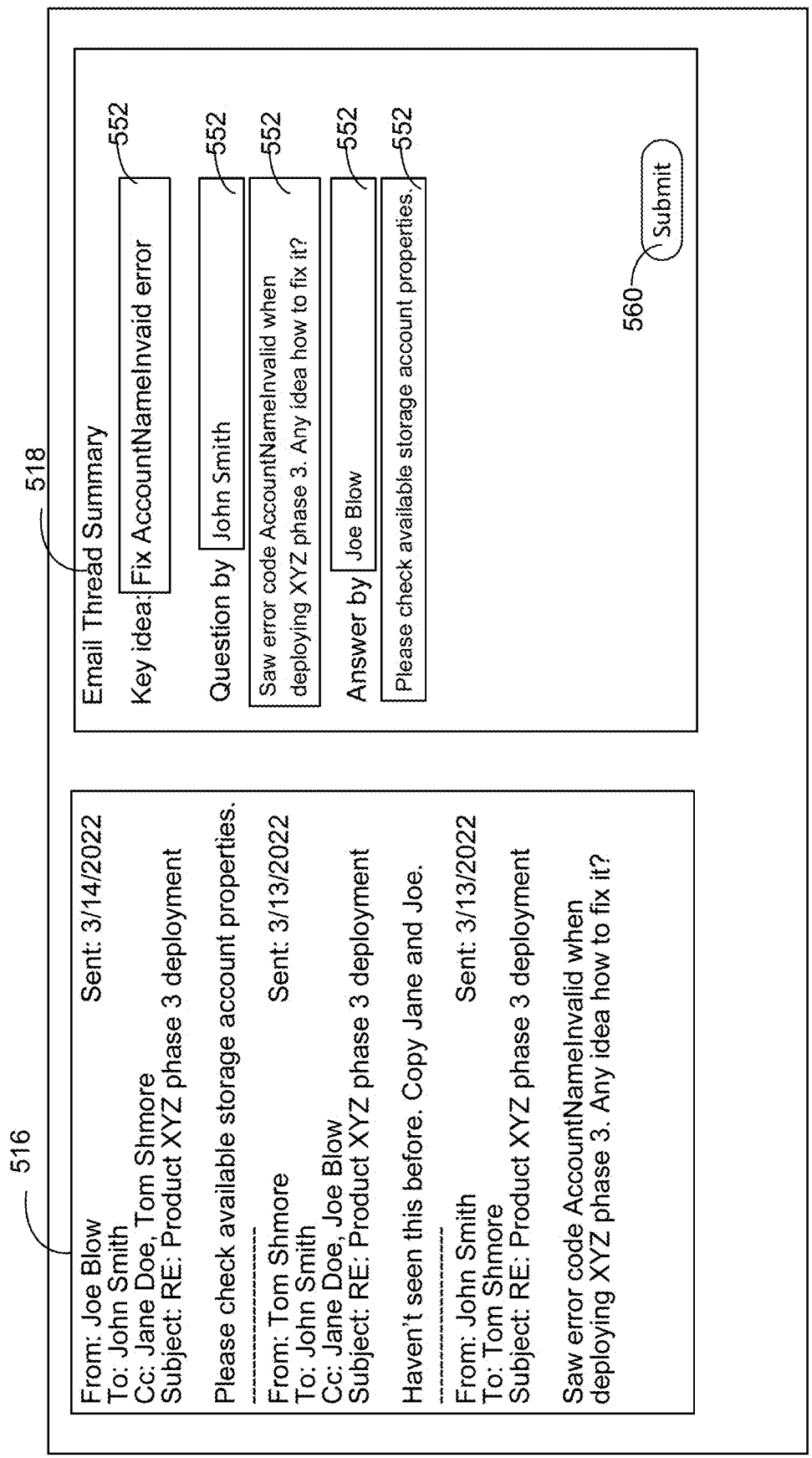
FIG. 5 illustrates an example email thread summary with editable fields in accordance with aspects of the disclosure.

In another example, with reference to FIG. 5, the processor 102 may generate a summary 518 of the email thread 516, present the summary to the recipient in an editable format, such that the recipient can manually edit the summary via a GUI displayed to them as shown through editable fields 552. Upon completion, the recipient may submit the edited summary by clicking a submit button 560. The processor 102 may be configured to store the updated summary in the memory 104. The edited summary may be used as training data to train the machine learning model.

In one example, the processor 102 may process one email at a time from an email thread. When a new email arrives, the processor 102 may detect new questions from the email, and detect new answers from the email. The memory 104 may include existing corpus of summaries of a plurality of email threads. The processor 102 may identify the existing summary of the email thread associated with the new email. The existing summary may include questions, answers and key points of the email thread up to date. The processor 102 may determine if any update needs to be made to the existing summary. For instance, the processor 102 may update the summary to reflect one or more of the following: any newly detected question, any new answer that responds to any existing question, key ideas, stakeholders and action items, among other possibilities. As the email thread goes on, the summary of the email thread may continue to evolve until the email thread ends.

In one example, the processor 102 may be configured to map questions and answers in the email thread based on one or more of the following: at least one uncommon or unique word such as a product name, at least one unique character or combination of characters, and at least one unique emoji or combination of emojis. For instance, concatenation of common words, common characters or common emojis may create a unique word.

Figure 6:
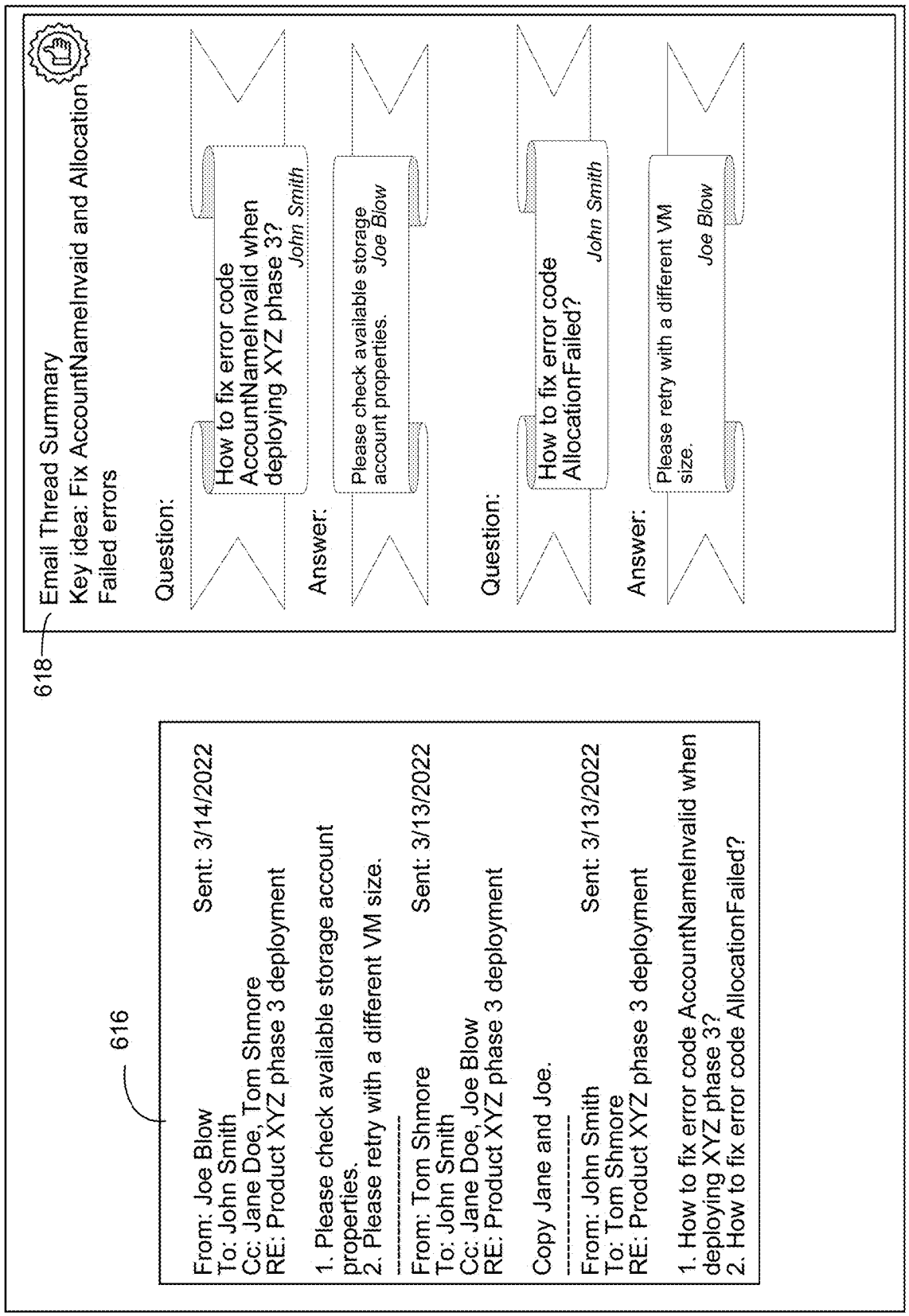
FIG. 6 illustrates an example email thread summary recognizing questions and answers by number identification in accordance with aspects of the disclosure.

In one example, the processor 102 may map answers to questions based on content relevancy. In another example, the processor 102 may map answers to questions based on number identification, where any question and its corresponding answer are identified by a same number. With reference to FIG. 6, questions in the email thread 616 may be identified by numbers. A corresponding answer to a question may cite the same number that identifies the question. As such, the processor 102 generates a summary 618 of the email thread 616 where answers are mapped to questions based on number identification.

Figure 7:
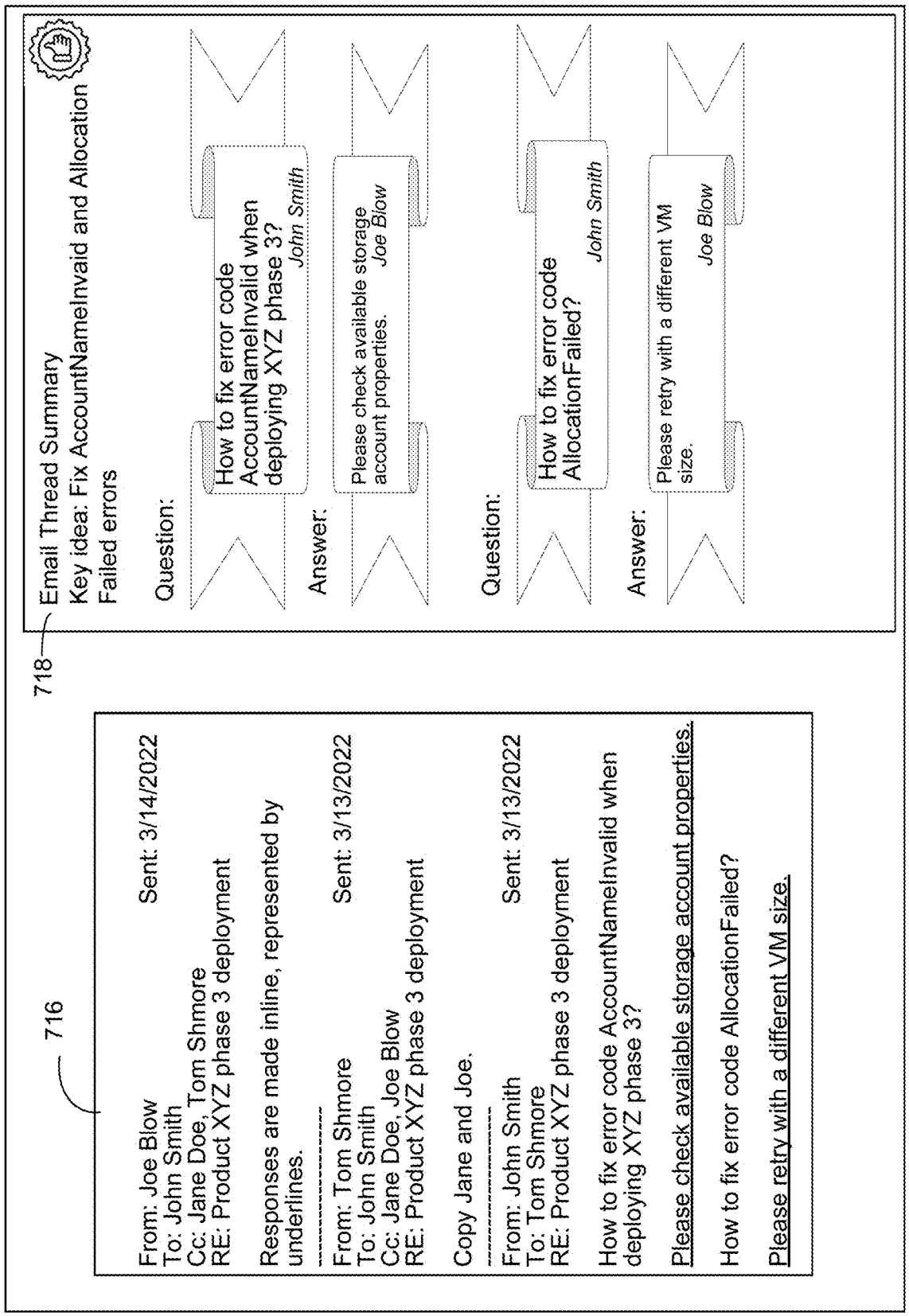
FIG. 7 illustrates an example email thread summary recognizing inline answers to questions in accordance with aspects of the disclosure.

In yet another example, the processor 102 may map answers to questions based on the proximity between any question and its corresponding answer. For instance, with reference to FIG. 7, in the email thread 716, an inline answer may be provided within earlier email content that has the question. The processor 102 may map questions and answers based on their close proximity, and generate the summary 718 of the email thread accordingly. Here, by way of example, close proximity may be within 2 or 3 other sequential messages in the thread, no more than 5 messages in the thread, or some other number of messages.

Figure 8:
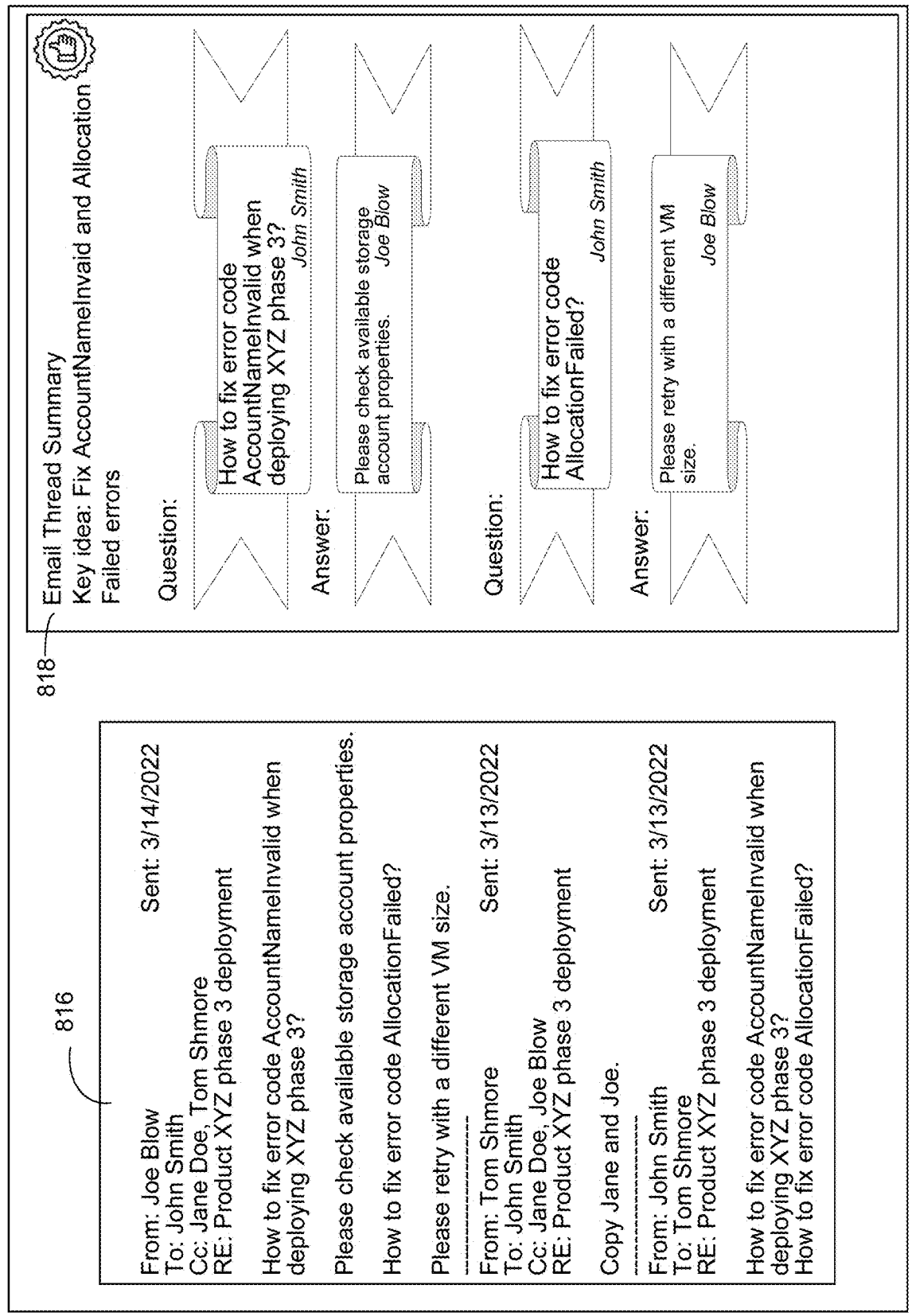
FIG. 8 illustrates an example email thread summary mapping answers to questions due to proximity in accordance with aspects of the disclosure.

In another instance, a question from an earlier email content may be copied and pasted in the new email, and an answer may be provided immediately next to the question, as shown in the email thread 816 of FIG. 8. The processor 102 may map questions and answers based on their close proximity, and generate the summary 818 accordingly.

Additionally, the processor 102 may be configured to map questions and answers in the email thread based on one or more of the following: proximation of characters that have a causal relationship, and identification of adjacent emails that have a causal relationship. For instance, the processor 102 may determine a causal relationship between emails if the new email does not include any question, whereas the preceding email has a question. In this instance, content in the new email may be deemed to have a causal relationship with the question. Thus, content in the new email may be deemed as an answer to the question in the preceding email. In one example, the processor 102 may map answers to questions according to a heuristic approach, for instance, based on proximity of characters that are causal to each other.

In another example, the questions and answers of the email thread may be identified by tagging or annotating.

The email thread summary, when displayed to the recipient, may visually indicate any detected question, and any potential answer that responds to the question. The detected questions and answers may be visually indicated in a manner distinct from remaining content of the email thread. The summary may also visually indicate any question in the email thread without any corresponding answer.

For example, with reference to FIG. 1, the detected questions may be visually indicated via a first banner 137. The first banner 137 may be positioned around the detected question. Answers responding to the questions may also be visually indicated via a second banner 138. Another banner 139 may be used to indicate unanswered question. Banners for answered questions, answer and unanswered question may be different. For instance, for an answered question, the banner 137 may be a down ribbon. For an unanswered question, the banner 139 may be a curved down ribbon. For an answer, the banner 138 may be an up ribbon.

A badge may be displayed in the summary area to indicate status of the email thread. For example, if the summary identifies any unanswered question and/or open action item, an alarm badge 130 may be displayed in the summary as shown in FIG. 1. In the event that all questions are answered, and/or there is no any open action item, a thumbs-up badge 430 may be displayed in the summary as shown in FIG. 4.

In one example, the processor 102 may be configured to display the summary of the email thread in a running widget 140 as shown in FIG. 1. The running widget may be accessible to the recipient of the email thread at any point while the email thread is ongoing, or even when the email thread has concluded. In one example, whenever a recipient views any email thread 116, the running widget 140 may be displayed on a right-hand side.

Figure 9:
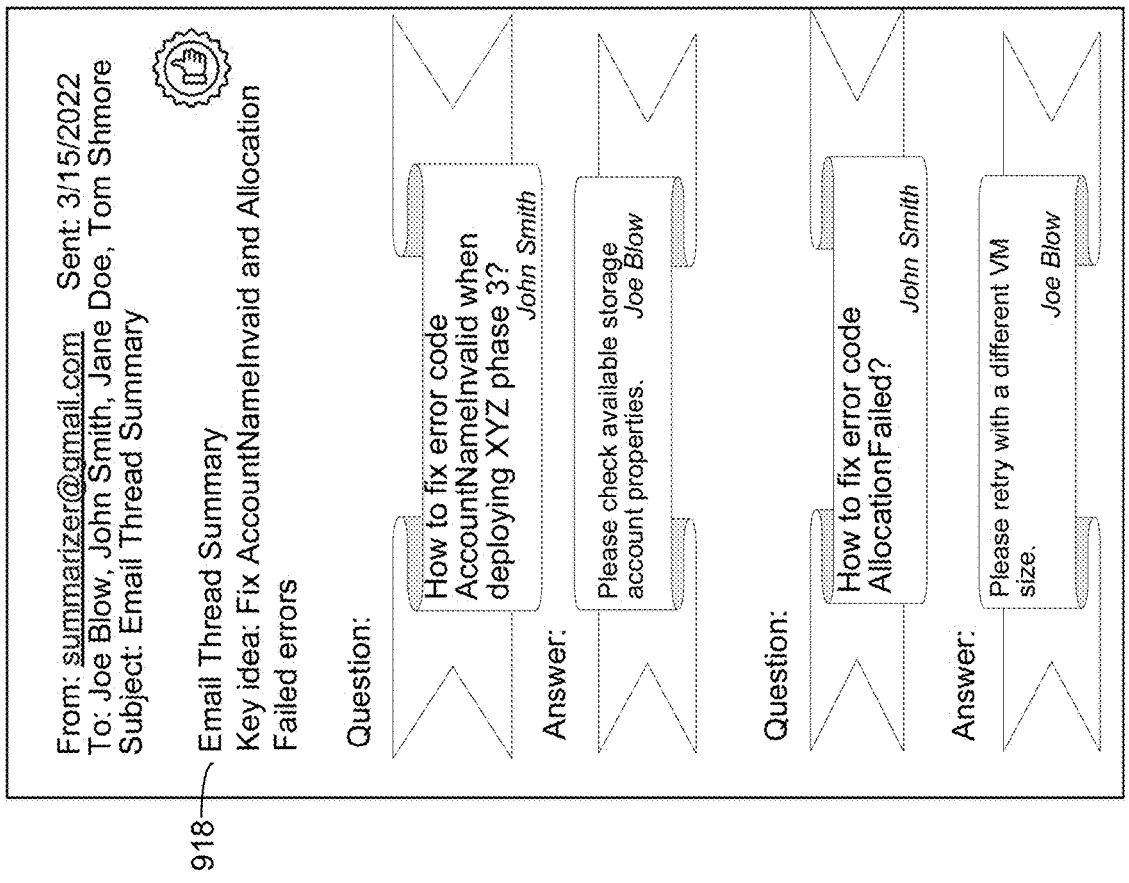
FIG. 9 illustrates an example email thread summary in an email format in accordance with aspects of the disclosure.

Alternatively, with reference to FIG. 9, the processor 102 may send the summary 918 of the email thread 916 as a separate summary email (or text or other notification to one or more users).

In one example, if there is an activity on the email thread, such as a new email arrives, the processor 102 may update the summary 918 of the email thread based on the activity on the email thread. The summary may indicate any open question that still has not been answered.

Once the processor 102 determines that the email thread has concluded, the processor 102 may send the summary in an email format and indicate any unanswered question or action item in the email thread. The processor 102 may inform the recipient through the summary to revisit the email thread to address any unanswered questions (or questions with answers that may benefit from clarification).

If every question has been answered and the email thread is inactive, the processor 102 may send out a summary of the email thread, indicating that everything that has been discussed. Here, inactive threads may include threads in which there has been no activity for a selected amount of time. This could be one or more days, weeks, months, etc. The selected amount of time may depend on the type of thread. For instance, in an email thread, inactivity may be determined after 1 or 2 weeks, while in a text thread or an on-line messaging thread, inactivity may be determined after 1-3 days (or more) or even less than 24 hours.

In the event that any inactive email thread becomes active again, the processor 102 may retrieve from the memory the summary of the email thread, update the summary as the email thread grows, and store the updated summary into the memory.

In another example, the processor 102 may send the summary of the email thread in an email, text, chat or other format on a regular basis, such as on a daily basis, until the email thread has concluded. In the event that an inactive email thread becomes active again, the processor 102 may start sending the summary of the email thread on a regular basis until the email thread becomes inactive again.

In one example, the processor 102 may be configured to determine an end or a conclusion of the email thread based on at least one or more of the following: a period of inactivity of the email thread, and sentiment analysis of a final email in the email thread. In one example, the processor 102 may perform the sentiment analysis based on emojis or graphics presented in the email.

Further, the processor 102 may send out the summary of the email thread in response to a triggering event. Triggering can be automatic and/or manual. For instance, triggering can be automatic when the system identifies that a new question has been posed in an email and notifications generated on a customizable cadence (e.g., daily batch, every time the question/email thread is updated, etc.). Users may also manually invoke this by user input that indicates to the processor to summarize the email, with the result either stating what open and closed questions were found and actions needing to be taken, or a blank result stating that no questions were located.

Figure 10:
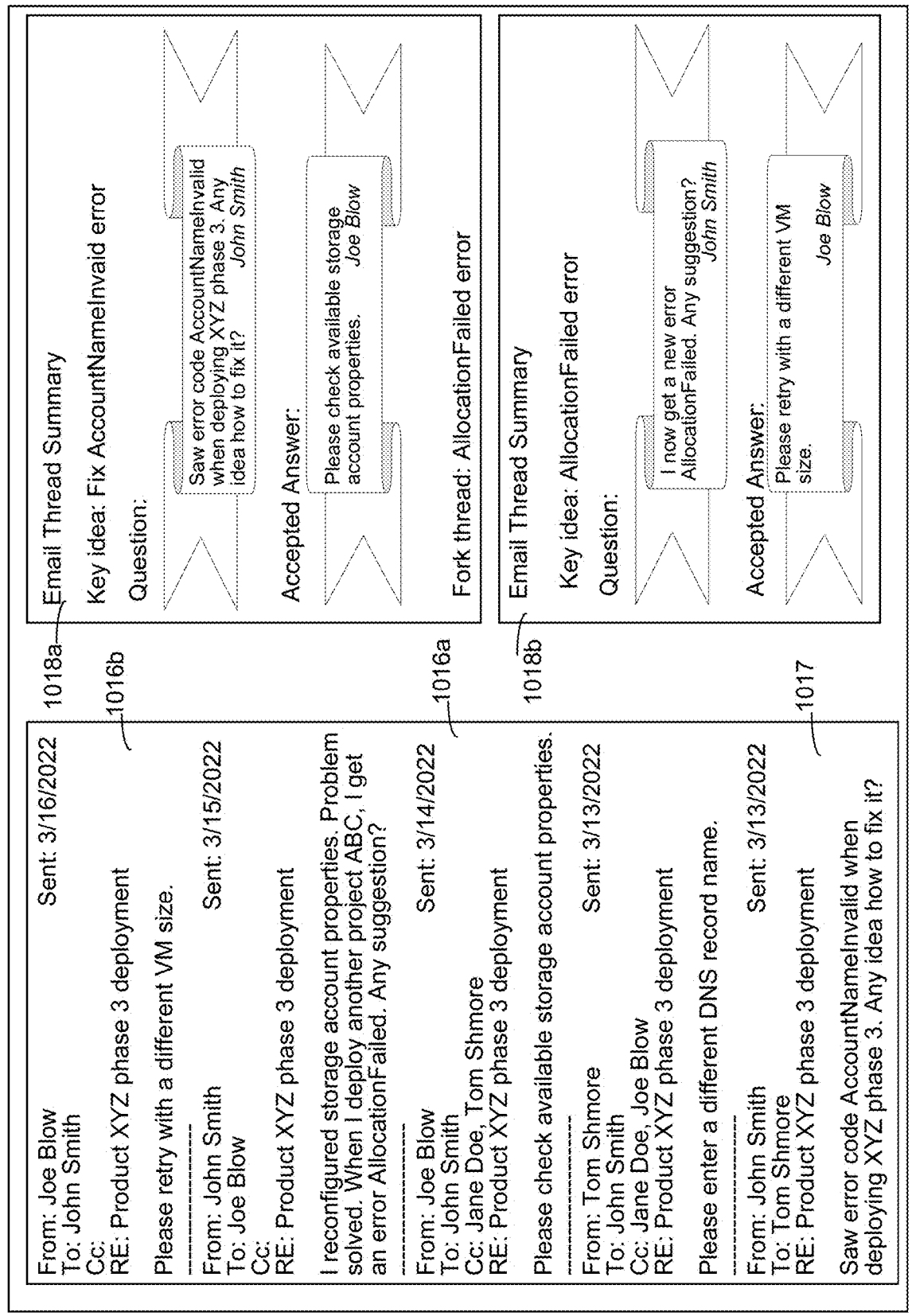
FIG. 10 illustrates example email thread summaries of an original email thread and a fork email thread in accordance with aspects of the disclosure.

With reference to FIG. 10, in one example, the processor 102 may identify at least one fork email thread 1016*b* featuring a topic materially distant from an original topic of the original email thread 1016*a*. The processor 102 may ascertain the original topic based on original content presented in the root email 1017 of the original email thread 1016*a*. The processor 102 may identify the fork email thread 1016*b* by determining if its content presented therein materially deviates from the original topic. The processor 102 may in turn generate an individual summary 1018*b* for each fork email thread. For example, a summary 1018*b* for a fork email thread 1016*b* may include all questions and answers that appear in the fork email thread. Different fork email threads may contain different questions and answers, which are reflected accordingly in the individual summaries of the fork email threads. Recipients of each fork email thread may be a subset of recipients of the original email thread, or may be a group entirely different from recipients of the original email thread. In one example, the processor 102 may be configured for output for display the generated summary for each fork email thread to one or more recipients of each fork email thread. A fork can be detected by the system from both when the set of email addresses on a thread is reduced, when specific text indicators are present (e.g. "—Alice" or "Removing people from thread"). According to one aspect, adding new people to a thread does not cause a fork. However, situations may exist where one or more individuals are removed and then added back to the thread. In such instances, a temporary fork can exist and the threads can be recombined if this situation occurs.

As for the summary 1018*a* of the original email thread 1016*a*, the processor 102 may update that summary 1018*a* to indicate any fork email thread originated from it. For instance, the summary 1018*a* of the original email thread 1016*a* may identify any fork email thread featuring a distinct topic deviating from the original topic of the original email thread. The summary 1018*a* of the original email thread 1016*a* may exclude questions and answers that appear in the fork email thread 1016*b*.

Figure 11:
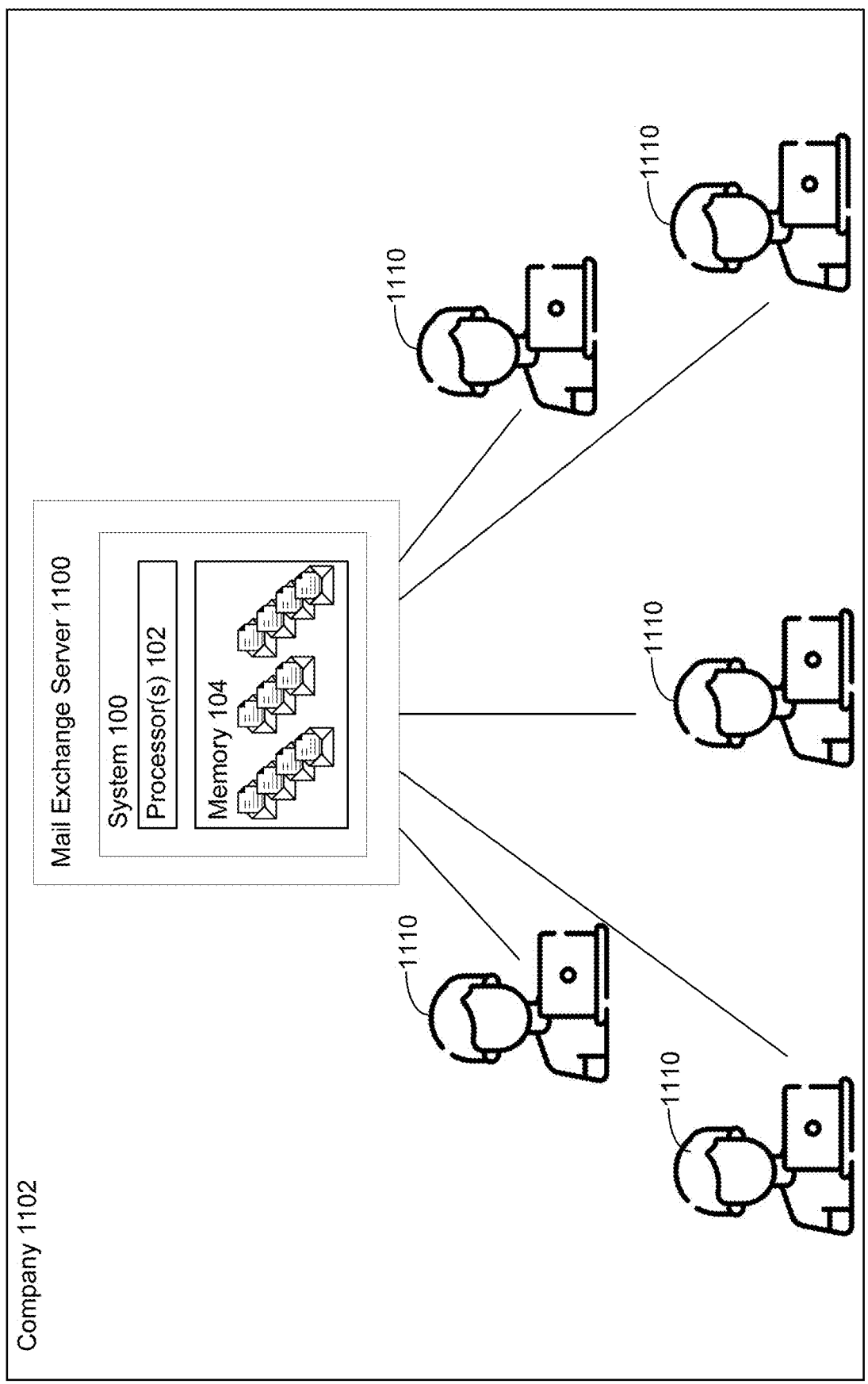
FIG. 11 illustrates a functional diagram of a mail exchange server in accordance with aspects of the disclosure.

With reference to FIG. 11, the system 100 may be part of a mail exchange server 1100. In one example, the mail exchange server 1100 may be an outlook mail exchange server. The mail exchange server may be a localized mail exchange server for a company 1102, such that the system may summarize any email thread written or received by any employee 1110 of the company. Alternatively, the system 100 may be part of another type of communication service, such as a chat or text service, or an online messaging platform.

Figure 12:
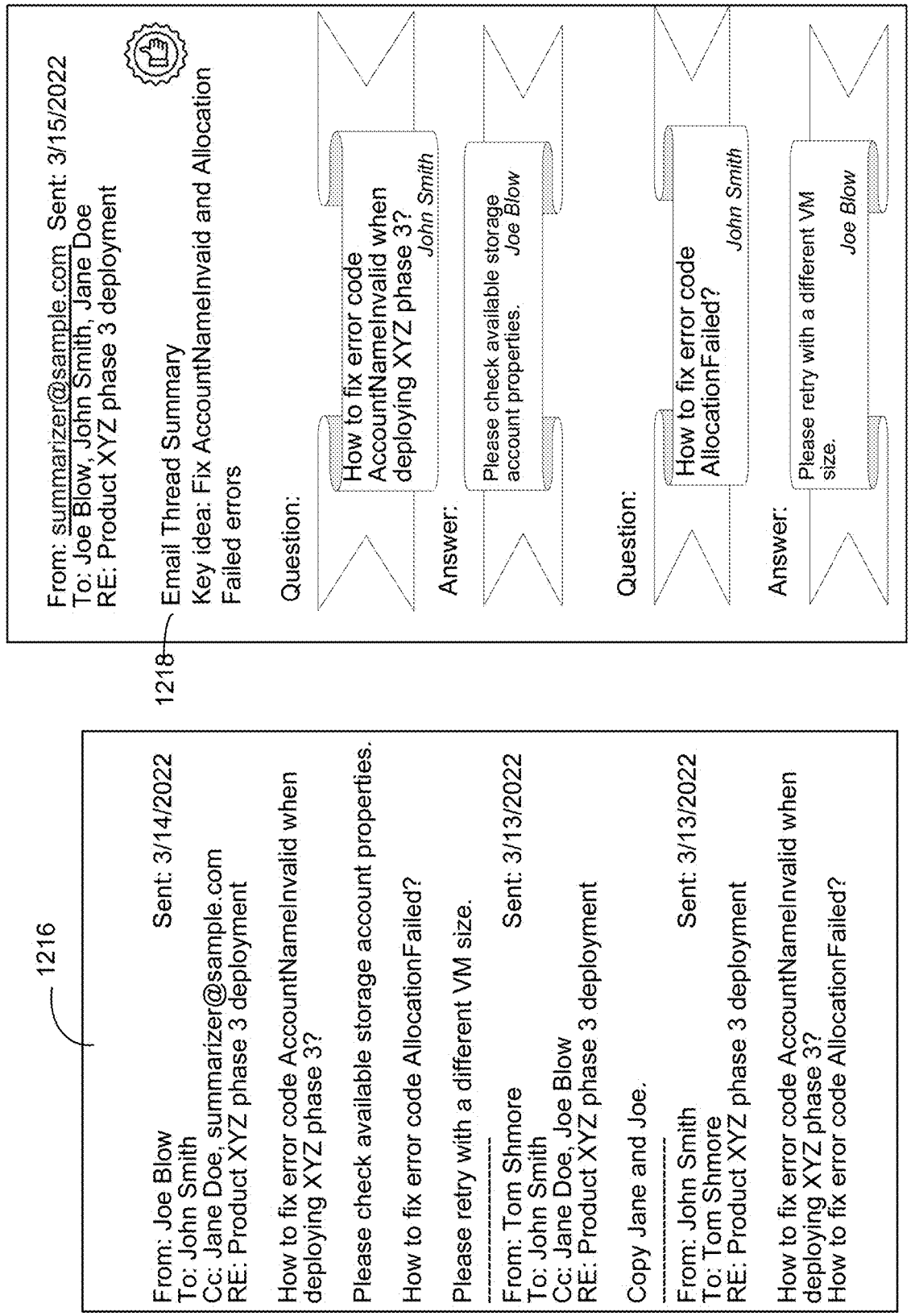
FIG. 12 illustrates an ad-hoc email thread summary in accordance with aspects of the disclosure.

With reference to FIG. 12, in one example, summarization of the email thread may be handled on an ad hoc basis. The processor 102 may be configured to generate a summary of an email thread, in response to a request email. The processor 102 may send the generated summary of the email thread as a reply to the request email. For example, if a user desires to receive a summary of an email thread, the user may forward the email thread to a specific, predetermined email address such as summarizer@sample.com, or copy the above email address on the email thread, as shown in FIG. 12. Whenever such a request is received at this email address summarizer@sample.com, the processor 102 may generate a summary 1218 for the email thread 1216, by detecting questions and answers in the email thread. The processor 102 may send the generated summary 1218 of the email thread to the user, or to one or more recipients of the email thread, or send the generated summary as a reply to the email thread.

In another example, if a user desires to receive an aggregated summary of multiple email threads, the user may forward these email threads to a specific, predetermined email address such as summarizer@sample.com. Whenever such a request is received at this email address summarizer@sample.com, the processor 102 may generate a summary for each of the email threads, by detecting questions and answers in each email thread. The processor 102 may aggregate the summary for each email thread. The aggregated summary may include questions and answers in each email thread. The processor 102 may send the aggregated summary to the user, or to one or more recipients of the email threads, or send the aggregated summary as a reply to the user's request. For instance, the user may attach multiple email threads to an email, each thread may feature a different error that occurs in deployment of Product XYZ phase, and send the email to summarizer@sample.com. The processor 102 may generate an aggregated summary that identifies all questions and answers present in all the attached email threads.

In one example, the processor 102 may be configured to correlate a plurality of email threads based on their topics. If the summary of threads and the respective owners overlap to a significant degree, the system can recommend threads within the person's email that overlap and allow them to merge the email conversations and summaries into a single thread. By way of example, significant overlap may include at least 25-50% owner overlap.

In one example, the processor 102 may be configured to coalesce a plurality of email threads based on their topics. The processor 102 may identify multiple email threads that relate to the same topic. Such email threads may be deemed coalesced. In one example, the processor 102 may prompt the user to indicate how to handle the coalesced email threads. In one example, the processor 102 may combine the coalesced email threads into a giant email thread. In another example, when a reply is submitted in one of the coalesced email threads, the processor 102 may send an identical reply to at least one or all remaining email thread in the coalesced email threads.

Figure 13:
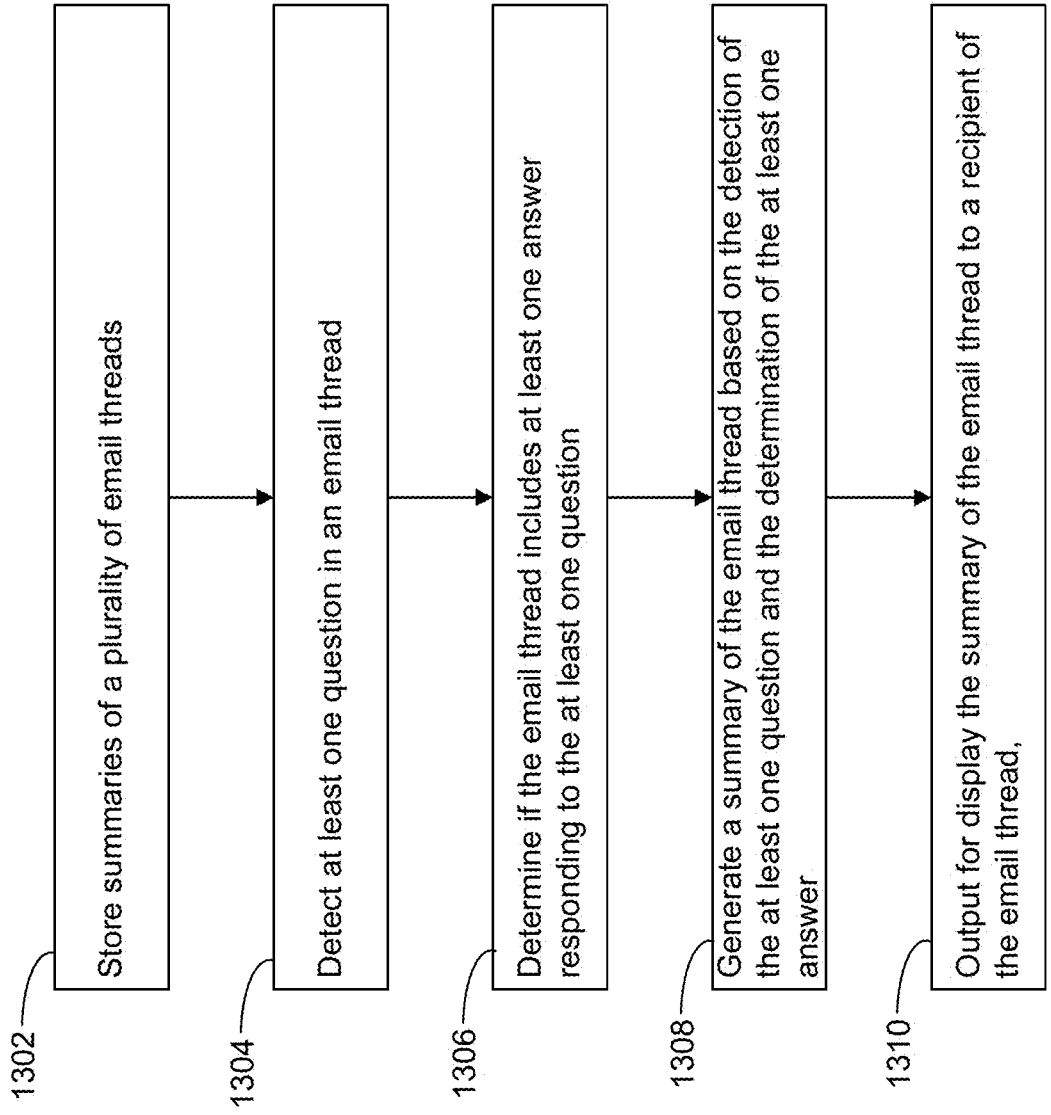
FIG. 13 illustrates a flow diagram showing an exemplary method for managing email threads in accordance with aspects of the disclosure.

FIG. 13 illustrates a flow chart illustrating a process for managing email threads. At 1302, the memory may store summaries of a plurality of email threads. At 1304, the processor 102 may detect at least one question in an email thread. At 1306, the processor 102 may determine if the email thread includes at least one answer responding to the at least one question. At 1308, the processor 102 may generate a summary of the email thread based on the detection of the at least one question and the determination of the at least one answer. At 1310, the processor 102 may output for display the summary of the email thread to a recipient of the email thread. The summary may visually indicate the detected at least one question. The summary may visually indicate the at least one answer responding to the at least one question. The detected at least one question and the at least one answer may be visually indicated in a manner distinct from remaining content of the email thread.

The summarization technology described above may extend to other applications, such as summarizing email threads, meeting minutes, discussion group exchanges, among other possibilities.

Figure 14:
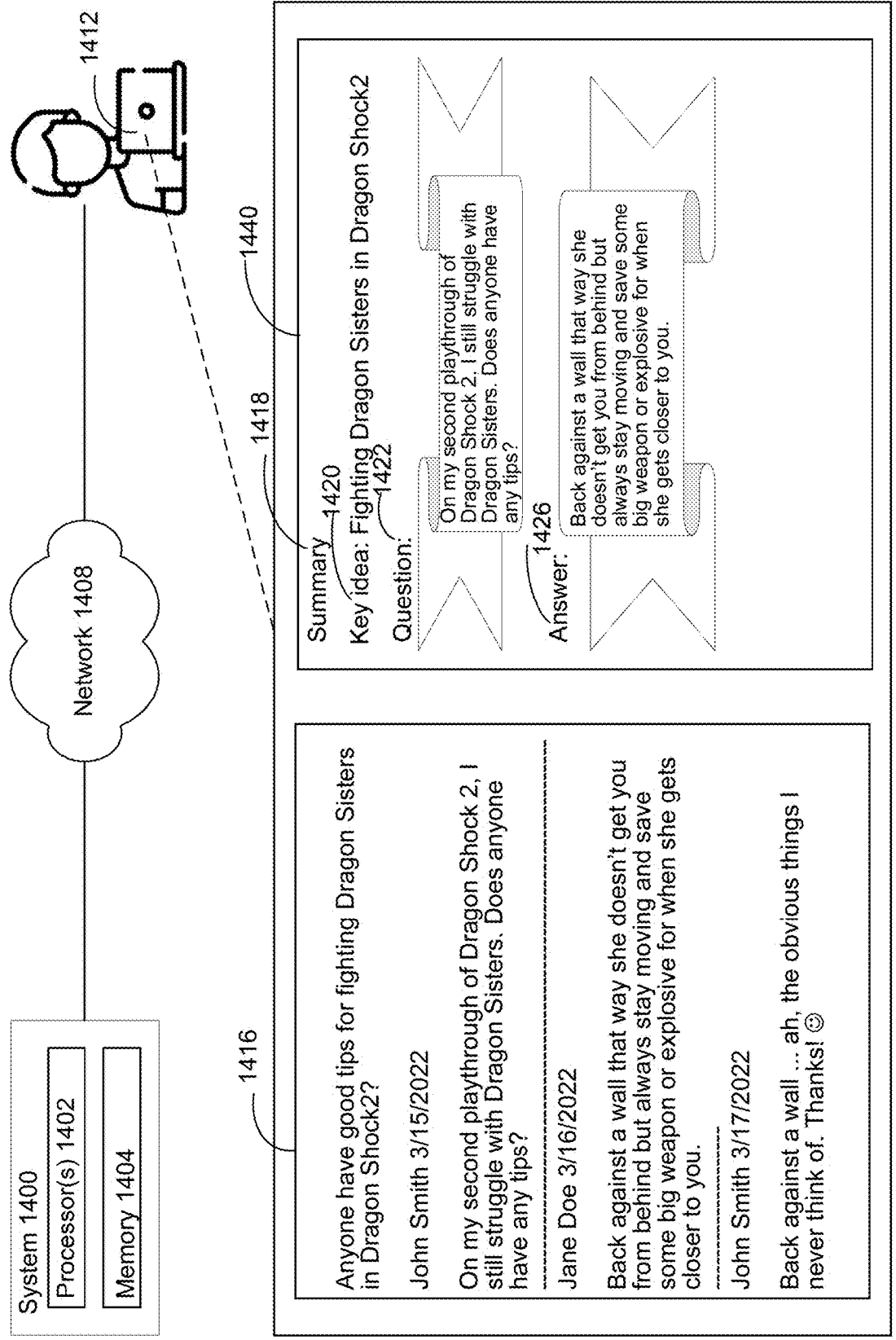
FIG. 14 illustrates a functional diagram of another example system in accordance with aspects of the disclosure.

FIG. 14 illustrates an exemplary system 1400 for summarizing content of any communication. The communication may be complex and unstructured, for example, including many replies. For instance, the communication may be a communication thread, such as in a forum with complex, multi-layer structure. Examples of the communication may include email threads, discussion group exchanges, and forum threads, voice conversation, and meeting minutes, among other possibilities.

The system 1400 may implement identical or similar summarization technology of the system 100. For example, the system 1400 may include one or more processors 1402. The processor 1402 may be configured to detect questions in a conversation 1416. The conversation may be derived from one or more of the following: a forum thread, an email thread, meeting minutes, a discussion group exchange, and a voice conversation.

The processor 1402 may determine if the conversation includes any answer responding to the question. The processor 102 may summarize questions and answers in the conversation. The processor 102 may generate a summary 1418 of the conversation based on the detected questions and answers. The summary 1418 may include key ideas 1420 of the conversation, questions 1422 and corresponding answers 1426 discussed in the conversation. The processor 102 may output for display the summary 1418 of the conversation in a user-friendly manner. The summary 1418 may visually indicate the detected questions and answers in a manner distinct from remaining content of the conversation.

In one example, the processor 1402 may be configured to display the summary of the conversation in a widget 1440. Alternatively, the processor 1402 may send the summary of the conversation as a separate summary email. For example, when a user browses a forum thread, the user may view the summary of the thread anytime via the widget 1402 or by requesting a summary email.

In another example, if questions and answers occur in a meeting or a video conference, the processor 1402 may be configured to perform audio or video processing, generate transcription of the meeting, and generate a summary for the meeting by analyzing the transcription. The summary of the meeting may include pairs of questions and answers. For instance, the processor 102 may identify a question raised by a speaker at a first timestamp, such as at a 2-minute mark, and identify an answer to the question raised by a second speaker at a second timestamp, such as at a 4-minute mark. The processor 102 may identify the answer to the question based on time, keyword and speaker. For example, if the second speaker speaks immediately after the 2-minute mark, using the same keyword as used by the first speaker, then content presented by the second speaker may be regarded as the answer to the question. If available, the summary may also include the name or other identifier of the speaker(s), such as an avatar or other indicia of a given speaker, as well as similar questions or answers that they or others have answered in the past (including in other videos, email, or otherwise) as reference/precedent.

FIG. 15A illustrates an example flow diagram showing an example machine learning process for annotating and summarizing email threads or email chains, which can be used to train (or update or validate) a model. One or more processors (e.g., processors 102 or 1402) may receive email chains 1502, and annotate questions and their answers, as illustrated in FIGS. 15B and 15C, via any combination of the following approaches: labeled examples (annotations) 1504, machine learning 1506, or heuristics 1508. Heuristics 1508 may include numbered bullets. The machine learning 1506 may be improved using output of heuristics 1508 and labeled examples 1504 as training. An annotated email chain 1510 can be generated from the approach(es). Based on the annotated email chain 1510, the processor(s) 102, 1402 may use one or more summarization techniques 1512 to create itemized summaries 1514. An example itemized summary 1514 is illustrated in FIG. 15D. Generic LLMs, such as T5, may be employed. The LLM may be fine-tuned using other summarization techniques. This data may be used to train an end-to-end (E2E) model that performs the process illustrated in FIG. 15A from email chains 1502 to itemized summaries 1514.

FIG. 15B shows an example annotated initial email 1520 of an email thread, and FIG. 15C illustrates an example annotated response 1540 in reply to the initial email 1520 of FIG. 15B. The initial email 1520 may include Question_1, Question_2 and Action Item, each of which may be annotated by a box of a different color. For example, Question_1 may be annotated by a first box 1522, Question_2 may be annotated by a second box 1524, and Action Item may be annotated by a third box 1526, each of which may have a different color, shading or fill to differentiate or highlight them. Their corresponding answers may be annotated by a box of the same property(ies). For instance, in the response 1540, partial answer to Question_1 may be annotated by a first box 1542, and answer to question_2 may be annotated by a second box 1544. A new question, Question_3, may be annotated by a third box 1546, which may have a distinct appearance from the other boxes.

FIG. 15D illustrates an example itemized summary 1514 of the email thread of FIGS. 15B and 15C, generated by a trained model. The summary 1514 may identify questions raised in the email thread, their corresponding answers, if any, as well as any action item and its related summary. Once generated, the itemized summary may be provided to one or more participants in the thread.

Systems 100, 1400 may be cloud-based server systems. The memory 104, 1404 may be databases that store information accessible by the one or more processors 102, 1402, including, but not limited to: instructions and data (e.g., machines translation mode(s), corpus information of summaries of email threads and/or summaries of conversations) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors 102, 1402 may be any conventional processors, such as commercially available GPUs, CPUs, TPUs, etc. Alternatively, each processor may be a dedicated device such as an ASIC or other hardware-based processor. Although FIGS. 1 and 14 functionally illustrate the processors, memory as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system. Accordingly, references to a processor or computing device will be understood to include references to a collection of processors or computing devices or memories that may or may not operate in parallel. The processors 102, 1402 may access the memory 104, 1404 via the network 108, 1408.

The user device 112, 1412 may include a computing system and/or a desktop computer. Other types of user devices 112, 1412 include tablet, netbook or other types of laptop computers, mobile phones, wearable computing devices (e.g., a smartwatch or a head-mounted display device), etc. The user device 112, 1412 may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The system 100, 1400 may communicate with the user device 112, 1412 via one or more networks 108, 1408. The network may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computing devices, such as modems and wireless interfaces.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for managing message threads, comprising:
memory configured to store summaries of a plurality of message threads; and
one or more processors configured to:
detect, based on a machine learning model, at least one question in a message thread of the plurality of message threads;
determine, based on the machine learning model, if the message thread includes at least one answer corresponding and responding to the detected at least one question;
generate, based on the machine learning model, a summary of the message thread including the detected at least one question, the at least one answer, and a survey prompting a recipient of the message thread to indicate whether the at least one answer is acceptable for the detected at least one question; and
output for display visually together to the recipient of the message thread alongside text from the message thread:
the summary of the message thread;
an indication of the detected at least one question;
an indication of the at least one answer, wherein at least one of the indication of the detected at least one question or the indication of the at least one answer is visually indicated via a banner;
an indication that the at least one answer corresponds and responds to the detected at least one question; and
an indication of the survey.

2. The system of claim 1, wherein the summary visually indicates whether the at least one answer has been accepted.

3. The system of claim 1, wherein the summary visually indicates a different question in the message thread without a corresponding answer.

4. The system of claim 1, wherein the message thread is an email thread and the one or more processors are configured to display the summary of the email thread in a widget.

5. The system of claim 1, wherein the summary is displayed to the recipient in an editable manner which allows the recipient to update the summary, and wherein the one or more processors are configured to store the updated summary in the memory.

6. The system of claim 1, wherein the summary identifies one or more of the following: a party who asked the at least one question, a party who provided the at least one answer responding to the at least one question, at least one action item resulted from the message thread, and a party responsible for the at least one action item.

7. The system of claim 1, wherein the one or more processors are configured to map questions and answers in the message thread based on one or more of the following: at least one uncommon word, at least one unique character, or at least one unique combination of emojis.

8. The system of claim 1, wherein the one or more processors are configured to map questions and answers in the message thread based on one or more of the following: number identification where any question and its corresponding answer are identified by a same number, proximation between any question and its corresponding answer, proximation of characters that have a causal relationship, or identification of adjacent emails that have a causal relationship.

9. The system of claim 1, wherein the one or more processors are configured to determine an end of the message thread based on at least one or more of the following: a period of inactivity of the message thread or sentiment analysis of a final message in the message thread.

10. The system of claim 1, wherein the message thread is an email thread and the system is part of a mail exchange server.

11. The system of claim 1, wherein the one or more processors are further configured to:
initiate the detection of the at least one question in the message thread, in response to a request message, and send the generated summary of the message thread as a reply to the request message.

12. The system of claim 1, wherein the one or more processors are further configured to correlate a plurality of message threads based on their topics.

13. The system of claim 1, wherein the one or more processors are further configured to coalesce the plurality of message threads based on their topics.

14. The system of claim 13, wherein the one or more processors are further configured to:
when a reply is submitted in one of the coalesced plurality of message threads, send an identical reply to at least one remaining message thread in the coalesced plurality of message threads.

15. The system of claim 1, wherein the one or more processors are further configured to train the machine learning model to:
detect the at least one question in the message thread;
determine if the message thread includes the answer corresponding and responding to
the detected at least one question; and
generate the summary of the message thread.

16. A method for managing message threads, the method comprising:
detecting, by one or more processors based on a machine learning model, at least one question in a message thread;
determining, by the one or more processors based on the machine learning model, if the message thread includes at least one answer corresponding and responding to the detected at least one question;
generating, by the one or more processors based on the machine learning model, a summary of the message thread including the detected at least one question, the at least one answer, and a survey prompting a recipient of the message thread to indicate whether the at least one answer is acceptable for the detected at least one question;
storing, by the one or more processors, the summary of the message thread in memory; and
outputting, by the one or more processors, for display visually together to the recipient of the message thread alongside text from the message thread:
the summary of the message thread;
an indication of the detected at least one question;
an indication of the at least one answer, wherein at least one of the indication of the detected at least one question or the indication of the at least one answer is visually indicated via a banner;
an indication that the at least one answer corresponds and responds to the at least one question; and
an indication of the survey.

17. A system for summarizing content of a communication application, comprising:
one or more processors configured to:
detect, based on a machine learning model, at least one question in a conversation associated with the communication application;
determine, based on the machine learning model, if conversation includes at least one answer corresponding and responding to the detected at least one question;
generate, based on a machine learning model, a summary of the conversation including the detected at least one question, the at least one answer, and a survey prompting a recipient of the conversation to indicate whether the at least one answer is acceptable for the detected at least one question; and
output for display visually together alongside text from the conversation:
the summary of the conversation;
an indication of the detected at least one question;
an indication of the at least one answer, wherein at least one of the indication of the detected at least one question or the indication of the at least one answer is visually indicated via a banner;
an indication that the answer corresponds and responds to the detected at least one question; and
an indication of the survey.

18. The system of claim 17, wherein the conversation is derived from one or more of the following: a forum thread, an email thread, computerized meeting minutes, a messaging group exchange, a voice conversation, or a videoconference meeting.

* * * * *